United States Patent [19]
Lyles

[11] Patent Number: 5,366,076
[45] Date of Patent: Nov. 22, 1994

[54] CONTAINER FOR FISHING ROD AND REEL

[76] Inventor: John M. Lyles, 5723 N. 6th St., Fresno, Calif. 93710

[21] Appl. No.: 68,924

[22] Filed: May 28, 1993

[51] Int. Cl.⁵ ............................................. B65D 85/00
[52] U.S. Cl. .................................... 206/315.11; 43/26
[58] Field of Search ......................... 206/315.11; 43/26

[56] References Cited

U.S. PATENT DOCUMENTS

| | | |
|---|---|---|
| 754,971 | 3/1904 | Cloherty . |
| 827,736 | 8/1906 | Lamphier ................... 206/315.11 X |
| 2,149,087 | 2/1939 | Fisher ........................... 206/315.11 X |
| 2,591,674 | 4/1952 | Chalker ........................ 206/315.11 X |
| 2,650,449 | 9/1953 | Suring .......................... 206/315.11 X |
| 2,749,645 | 6/1956 | McKern . |
| 2,902,790 | 9/1959 | Harvey ........................ 206/315.11 X |
| 3,674,190 | 7/1972 | Wright . |
| 3,972,144 | 8/1976 | Geisler ......................... 206/315.11 X |
| 4,546,877 | 10/1985 | Evans ............................. 206/315.11 |
| 4,628,628 | 12/1986 | Burgin et al. . |
| 4,858,366 | 8/1989 | Rushton ................... 43/26 |
| 4,967,504 | 11/1990 | Craft ........................ 43/26 |
| 5,137,319 | 8/1992 | Sauder . |

FOREIGN PATENT DOCUMENTS

| | | | |
|---|---|---|---|
| 658288 | 2/1963 | Canada ........................... 206/315.11 |
| 1419803 | 10/1965 | France ..................................... 43/26 |
| 2224916 | 5/1940 | United Kingdom ........... 206/315.11 |
| 2051564 | 1/1981 | United Kingdom ........... 206/315.11 |

Primary Examiner—William I. Price
Attorney, Agent, or Firm—Worrel & Worrel

[57] ABSTRACT

A container for a work object, such as a fishing rod and reel assembly or the like, the container having a housing with an internal chamber dimensioned to receive at least a portion of the work object therewithin; and an assembly mounted on the housing for retaining the work object in the internal chamber in a substantially ready position for removal therefrom.

8 Claims, 2 Drawing Sheets

CONTAINER FOR FISHING ROD AND REEL

BACKGROUND OF THE INVENTION

1. Field of the Invention

The present invention relates to a container and, more particularly, to such a container which is particularly well suited to the housing and transport of one or more fishing rod and reel assemblies.

2. Description of the Prior Art

In general, the structure and mode of operation of containers is dictated by the needs associated with the particular work objects that are to be housed within the containers. Containers for fishing rod and reel assemblies, as distinct from the fishing rod and reel disassembled from each other, present a multitude of difficulties. Except from the point of view of simply providing protection for the equipment, has always been recognized that it would be significantly more desirable to retain the fishing rod and reel assembly in an assembled condition ready for use. The convenience associated with storage in an assembled condition is readily apparent.

Notwithstanding this fact, prior art efforts directed toward the storage and transport of fishing rod and reel assemblies in fully assembled, or substantially fully assembled, conditions have proven less than successful. A fishing rod is, of course, lengthy and to that extent unwieldy. In addition to the inconvenience, this creates a significant risk of damage to the fishing rod. Further, the weight and lateral extension of the reel assembly from the longitudinal axis of the fishing rod is also a cumbersome condition. Unless the reel and rod are grasped in both hands, or housed in a completely secured relationship within a sealed container, the assembly is exceedingly difficult to control during storage and transport and therefore subject to damage by a host of contributing causes. Still further, the fishing line and fishing appliances, such as swivel assemblies, lures, hooks, and the like, are exceedingly difficult to control even when fully housed within a sealed container. Entanglement of the equipment is an ever present concern. In addition, the hazards associated with exposure to fishing lures, hooks, and the like are all too well known.

As a consequence, conventional practice dictates that fishing rod and reel assemblies are either stored and transported in fully assembled conditions so to be ready for use, or are disassembled and individually stored in container individually designed therefor so as to be fully protected and controlled. Both methods possess their own inherent disadvantages and hazards, as heretofore set forth. These problems are further complicated by the fact that many people possess two or more types of rod and reel assemblies designed for and devoted to specific applications. For example, many people possess and frequently use fishing rod and reel assemblies for individual use in bait casting, spin casting and trolling. Since, on any given occasion, any one or all of these fishing rod and reel assemblies may be employed, most commonly they are transported together, frequently in fully assembled form and either left entirely unprotected, or housed, for example, in a single compartment in an elongated bag. Under such conditions, the equipment easily becomes entangled and damaged.

Therefore, it has long been known that it would be desirable to have a container which is operable to house one or more work objects in positions substantially ready for use; which is particularly well suited to the containerization of fishing rod and reel assemblies in substantially fully assembled configurations ready for use, but otherwise protected from damage; which possesses the ability to house two or more fishing rod and reel assemblies in ready positions and so arranged as to be balanced for convenient handling; which occupies a minimum of area and can readily be moved between predetermined storage and transport attitudes; which is operable releasably to constrain fishing appliances such as lures, hooks and the like in ready positions substantially without hazard; and which is otherwise entirely effective in achieving its operational objectives.

SUMMARY OF THE INVENTION

Therefore, it is an object of the present invention to provide an improved container adapted to house one or more work objects stored in positions substantially ready for usage.

Another object is to provide such a container which is particularly well suited to the storage and transport of fishing rod and reel assemblies in positions substantially ready for use and otherwise entirely satisfactory for storage.

Another object is to provide such a container which is capable of housing a plurality of fishing rod and reel assemblies so arranged as to impart a balance to the container such that it possesses a stability convenient for storage and transport.

Another object is to provide such a container which possesses the ability to permit movement of a fishing rod and reel assembly to and from a ready position with little effort or attention dependably protecting the equipment in the ready position and, conversely, freeing the equipment for substantially immediate usage upon removal from the container.

Another object is to provide such a container which is operable securely and protectively to capture the fishing appliances borne by the fishing rod and reel assembly requiting little or no attention to the movement of the fishing appliances to and from the captured position.

Another object is to provide such a container which is adapted to house one or more fishing rod and reel assemblies constrained in such a fashion as to negate the imbalance conventionally associated with the asymmetrical construction of fishing rod and reel assemblies.

Further objects and advantages are to provide improved elements and arrangements thereof in an apparatus for the purpose described which is dependable, economical, durable and fully effective in accomplishing its intended purpose.

These and other objects and advantages are achieved, in the preferred embodiment of the present invention, in a container having a housing with an internal chamber dimensioned to receive at least a portion of the work object therewithin; and an assembly for retaining the work object in the internal chamber in a substantially ready position for removal therefrom.

DESCRIPTION OF THE PREFERRED EMBODIMENT

Figure 1:
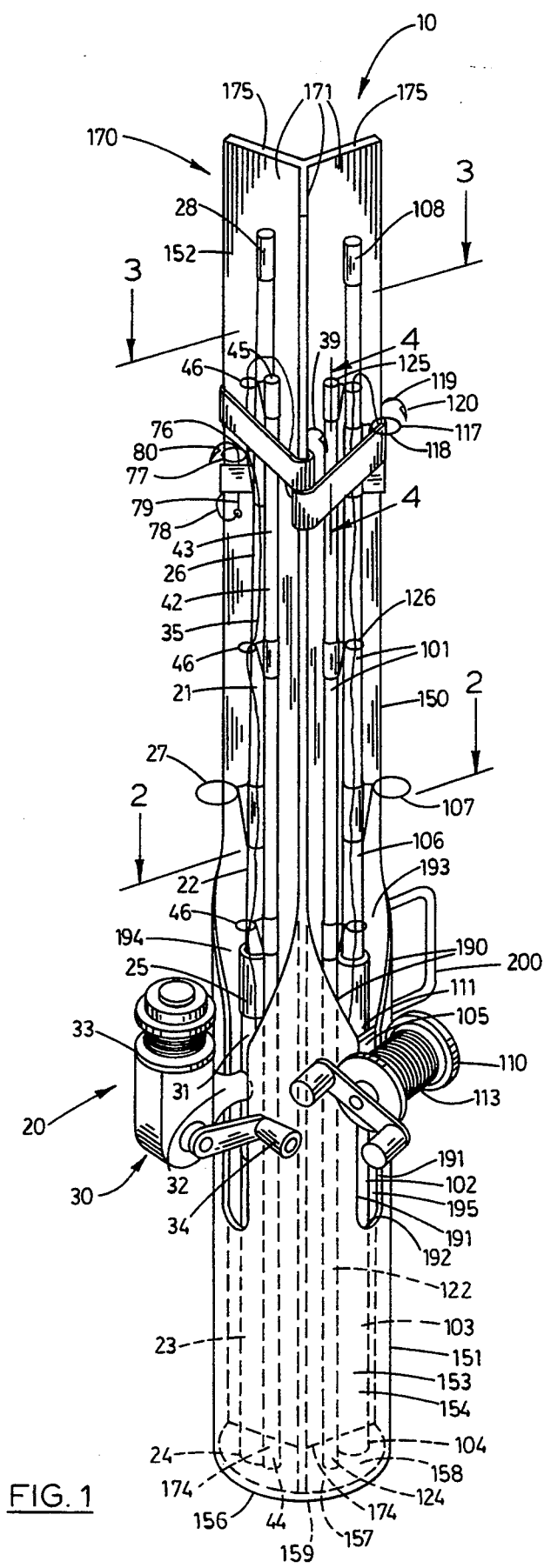
FIG. 1 is a perspective view of the container of the present invention shown, for illustrative convenience, housing three fishing rod and reel assemblies.

Referring more particularly to the drawings, the transporting apparatus, or container, of the present invention is generally indicated by the numeral 10 in FIG. 1. The container is operable to house a variety of different types of work objects. However, the container is particularly well suited to the housing of a plurality of fishing rod and reel assemblies and, for illustrative convenience, will be described in relation thereto.

Referring more particularly to FIG. 1, a bait casting rod and reel assembly is generally indicated at 20 in a "ready position." The bait casting rod and reel assembly include a rod assembly 21 having a handle section 22. The handle section has more specifically, a handle 23 having a lower end 24. The handle section includes a reel seating, or securing assembly, 25. A rod 26 is extended from the handle and mounts a line guide 27 and has a ferrule 28 at the distal end thereof.

A bait casting reel assembly 30, having a mount 31, is mounted on the reel securing assembly 25 in the conventional fashion grasping the mount 31 thereof. A linking member, or arm, 32 extends from the mount and has a reel 33 borne by the outer end thereof. The reel mounts a handle 34 operable to reel out or reel in fishing line 35 having a remote end portion 36. A swivel assembly 37 is mounted on the remote end portion of the fishing line and, in turn, mounts leader 38. The leader mounts a hook 39 having a barbed end 40.

The rod assembly 21 has a tip section 42 including a rod 43. A ferrule 44 is mounted on the inner end thereof for releasable engagement with the ferrule 28 in an assembled condition. The rod 43 has a tip 45 and mounts a plurality of line guides 46.

A second fishing rod and reel assembly is indicated at 60. For illustrative convenience it will be understood that the second rod and reel assembly can be a duplicate of the bait casting reel assembly 30, but will be considered for illustrative convenience to be a spinning rod and reel assembly. The spinning rod and reel assembly includes a rod assembly 61 having a handle section 62 affording a handle 63. The handle has a lower end 64. A reel seating, or securing assembly, 65 is mounted on the handle section. A rod 66 is extended from the handle and mounts a line guide 67. As with the bait casting reel assembly 30, the rod 66 of the spinning rod and reel assembly has a ferrule 68, not shown, at the distal end thereof.

A spinning reel assembly 70, having a mount 71, is mounted on the securing assembly 65 of the handle section 62 in the conventional fashion. The spinning reel assembly has a linking member, or arm, 72 extended from the mount and mounting a reel 73 at the distal end thereof. The reel mounts a handle 74 operable to reel out and reel in continuous fishing line 75. The fishing line has a remote end portion 76 on which is mounted a swivel assembly 77. Leader 78 is mounted on a swivel assembly and, in turn, mounts a hook 79 at the remote end thereof. The hook has a barbed end 80.

The spinning rod and reel assembly has a tip section 82 including a rod 83 mounting a ferrule 84, not shown. The ferrule 84 is connectible with the ferrule 68 to assembly the spin casting rod in an assembled condition.

The tip section has a tip 85 and mounts a plurality of line guides 86.

A third rod and reel assembly is generally indicated by the numeral 100. For illustrative convenience it will be understood that the third rod and reel assembly is a trolling rod and reel assembly. The trolling rod and reel assembly includes a rod assembly 101 having a handle section 102. The handle section includes a handle 103 having a lower end 104. The handle mounts a reel seating, or securing assembly, 105. A rod 106 is extended from the handle 103 and mounts a line guide 107. The rod mounts a ferrule 108 at the distal end thereof.

A trolling reel assembly 110 has a mount 111 which is secured in the conventional fashion on the securing assembly 105. The mount has a linking member, or arm, 112 on which is mounted a reel 113. The reel mounts a handle 114 operable to reel out and reel in fishing line 115. The fishing line has a remote end portion 116. A swivel assembly 117 is mounted on the remote end portion of the fishing line. In turn, leader 118 is mounted on the swivel assembly. A hook 119, having a barbed end 120, is mounted on the leader.

The trolling rod and reel assembly 100 has a tip section 122 including a rod 123 mounting a ferrule 124. The rod has a tip 125 and a plurality of line guides 126.

Returning then to the container 10 of the present invention, the container has a main housing generally indicated by the numeral 150. The main housing has a lower portion 151 and an opposite upper portion 152. The main housing can be constructed of any suitable material including, for example, aluminum, plastic or the like. The main housing has a cylindrical side wall 153 having a cylindrical exterior surface 154 and a cylindrical interior surface 155. The cylindrical side wall has a lower circular annulus 156 in which is mounted a flat bottom wall 157. The bottom wall has a flat interior surface 158 and an opposite flat exterior surface 159 which may be flush or slightly recessed from the lower annulus. The main housing has an interior generally indicated at 160.

The main housing 150 mounts a compartmentalizing assembly 170 centrally thereof. The compartmentalizing assembly includes three dividing walls 171 individually having outer lateral edges 172 and inner lateral edges 173. The inner lateral edges of the dividing walls are joined to define a longitudinal axis for the main housing concentric to the cylindrical side wall 153. The lower portions of the outer lateral edges 172 join the interior surface 155 of the cylindrical side wall. The dividing walls have lower edges 174 which join the interior surface 158 of the flat bottom wall 157. The dividing walls have upper edges 175 which are disposed in the same plane right-angularly related to the longitudinal axis of the main housing. The side walls have opposite side surfaces 176 which are flat.

The dividing walls 171 of the compartmentalizing assembly 170 divide the interior of the main housing including those portions extended from the cylindrical side wall 153, into a first compartment 181, a second compartment 182, and a third compartment 183. The relationship of these compartments to each other may best be visualized upon reference to FIGS. 2 and 3.

Referring more particularly to FIG. 1, it will be seen that the main housing, or more particularly the cylindrical side wall 153 in individually overlaying relation to the first compartment 181, the second compartment 182 and she third compartment 183, has converging edges 190. The converging edges lead downwardly into parallel edges 191 and terminate in an arcuate edge 192. The converging edges, parallel edges and arcuate edge define a channel, or guide passage, 193. The converging edges 190 over each compartment define an entrance opening 194. The parallel edges 191 and arcuate edge 192 overlaying each compartment define a slot 195.

Figure 2:
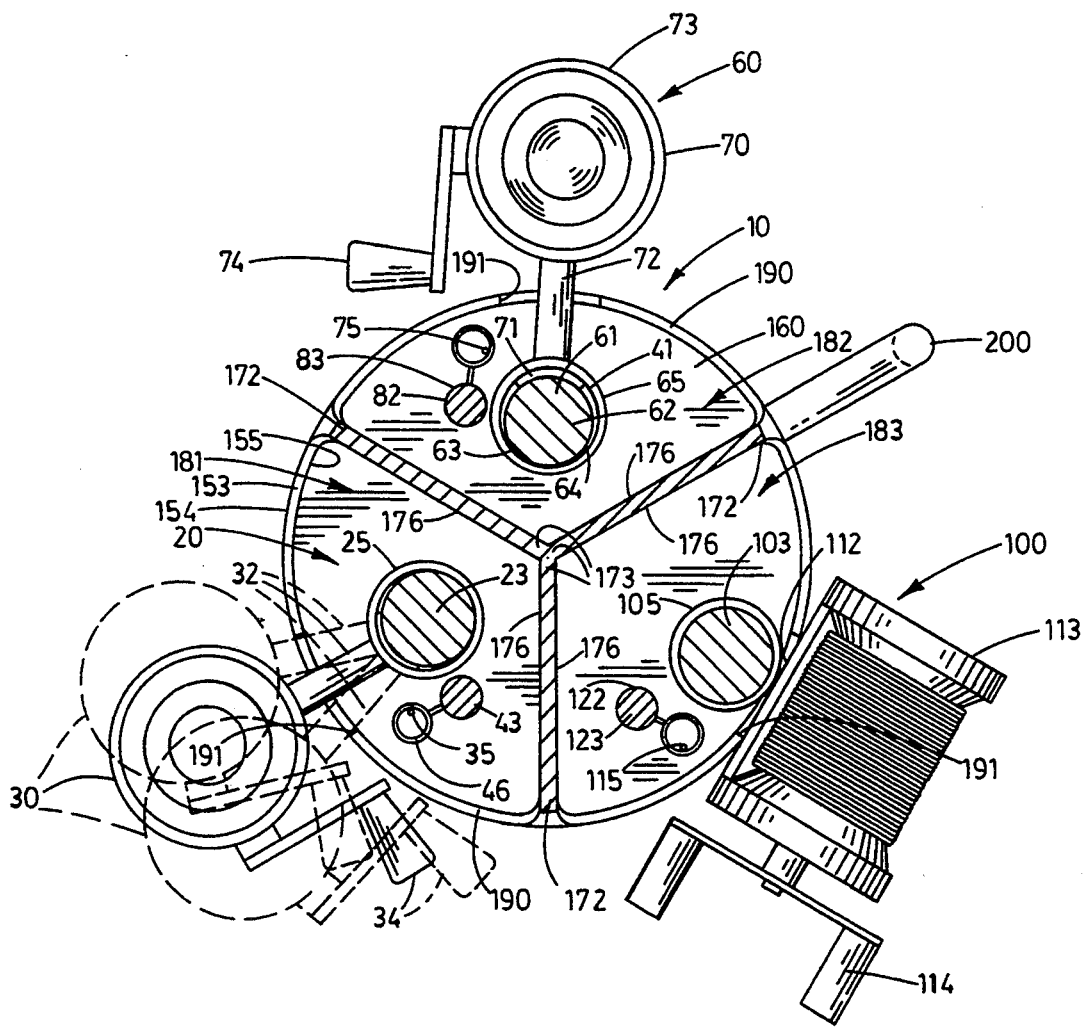
FIG. 2 is a somewhat enlarged transverse section taken on line 2—2 in FIG. 1.

As shown on FIGS. 1 and 2, a handle 200 is mounted on the cylindrical side wall 153 in alignment with the dividing wall 171, as shown in FIG. 2. The handle is mounted in the position described otherwise roughly corresponding to the level of the converging edges 190.

Figure 3:
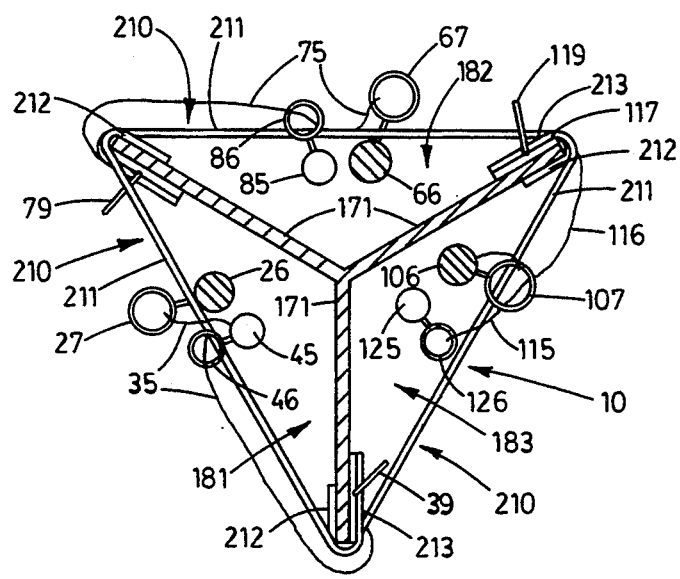
FIG. 3 is a somewhat enlarged transverse section taken on line 3—3 in FIG. 1.

A fastening assembly 210 is mounted in overlaying relation to the first compartment 181, the second compartment 182 and the third compartment 183. Each fastening assembly includes a strap 211 adhesively mounted on the side surface 176 of each dividing wall 171 extending across the adjacent first compartment 181, second compartment 182, and third compartment 183, as best shown in FIG. 3. Each strap is adhesively mounted at a mounting portion 212 and has an opposite fastening portion 213. For each fastening assembly 210, a first "Velcro" panel 214 is mounted on the side surface 176 of one of the dividing walls opposite the wall of the mounting portion 212 of that strap 211. A second "Velcro" panel 215 is mounted on the fastening portion 213 of each strap 211 for releasable interlocking engagement with the first "Velcro" panel 214, as shown in FIG. 3.

OPERATION

The operation of the described embodiment of the subject invention is believed to be clearly apparent and is briefly summarized at this point. The container of the subject invention can be employed to house a variety of work objects, but has particular utility in housing rod and reel assemblies.

As shown in FIGS. 1, 2 and 3 in the preferred embodiment, the container 10 of the present invention is adapted individually to house three rod and reel assemblies. For illustrative convenience, these include a bait casting rod and reel assembly 20, a spinning rod and reel assembly 60 and a trolling rod and reel assembly 100. Although not shown herein, the container can also be employee to house a fly casting rod and reel assembly, or any other type of rod and reel assembly.

Each rod and reel assembly is installed in its respective first compartment 181, second compartment 182 or third compartment 183, in substantially the same manner. The fastening assemblies 210 are individually released from the closed positions shown in FIGS. 1, 3 and 4 by releasing the first "Velcro" panels 214 from their respective second "Velcro" panels 215. Thereafter, for example, the tip section 42 is removed from the handle section 22 of the bait casting rod and reel assembly 20 and positioned in side-by-side relation therewith. The handle section and tip section are then slidably inserted within the first compartment 181 with the arm 32 of the bait casting reel assembly 30 aligned with the guide passage 193. Continued downward movement of the bait casting rod and reel assembly causes the arm 32 to be directed by contact with the converging edges 190 and parallel edges 191 into the guide passage until the lower end 24 of the handle 23 contacts the interior surface 158 of the flat bottom wall 157. Similarly, the ferrule 44 of the tip section 42 contacts the interior surface 158 so as to assume the rested position shown in FIG. 1. The fishing line 35 is at this time in an operational arrangement extended through the line guides 27 and 46 of the handle section 22 and tip section 42 as shown in FIG. 1. The arm 32 is restricted by contact with the parallel edges 191 so as to be retained in the position shown in FIG. 1.

Figure 4:
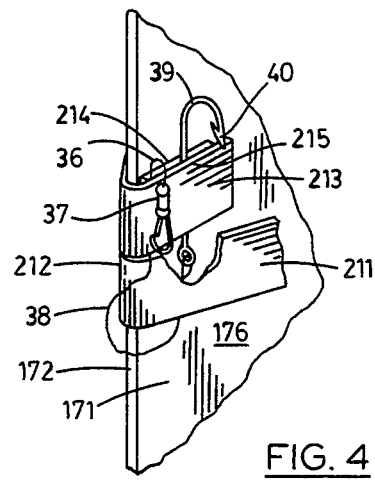
FIG. 4 is a somewhat enlarged, fragmentary side elevation taken from a position indicated by line 4—4 in FIG. 1.

The fishing line 35 is extended beyond the line guide 46 at the tip 45 of the tip section 42 and, as previously described, mounts the swivel assembly 37, leader 38 and hook 39. The operator grasps the hook 39 and positions it as shown in FIGS. 1 and 4. The strap 211 of the fastening assembly 210 is then extended to the closed position shown in those views and the first "Velcro" panel 214 interlockingly engaged with the second "Velcro" panel 215 so as to capture the hook and fishing line in the position shown in FIG. 4 between the two "Velcro" panels. As a consequence, the handle section 22 and tip section 42, as well as the fishing appliances borne by the remote end of the fishing line, are securely held in the positions shown in FIGS. 1, 2, 3 and 4.

This same process is repeated with respect to the spinning rod and reel assembly 60 and trolling rod and reel assembly 100. They are individually inserted in their respective second compartment 182 and third compartment 183. As a consequence, the three fishing rod and reel assemblies are retained in the positions shown in FIGS. 2 and 3. As shown in phantom lines in FIG. 2, the bait casting reel 30 is permitted a range of movement limited to those extremes depicted in the two phantom line positions therefor. A similar range of motion is available as to the spinning reel assembly. The reel 113 has a somewhat more restricted range of motion due to the immediate juncture of the securing assembly 105 and the reel 113. In any case, all three rod and reel assemblies are securely retained in position as well as the fishing appliances borne by the remote ends of the fishing lines.

The container 10 can be positioned as shown in FIG. 1 with the bottom wall 157 rested on a horizontal surface of support so as to retain the container and its contents in a stable upright attitude. This is a convenient position for storage, such as in the corner of a closet or other confined area. As can be visualized upon reference to FIG. 2, even though the fishing rod and reel assemblies are individually unstable due to their asymmetric construction, storage as described in the container in their individual first compartment 181, second compartment 182 and third compartment 183 causes the container to be stable and well balanced so that it does not fall over while in storage.

When the fishing rod and reel assemblies 20, 60 and 100 we to be used, the handle 200 of the container 10 is grasped to lift and rotate the container about ninety degrees (90) so that the longitudinal axis of the container is approximately horizontal. Because the handle is positioned nearest the heaviest portion of the container when loaded as described, the handle is positioned in a position of approximate balance so the container can easily be carried in this horizontal attitude. However, the container is always available to be rested on a horizontal surface of support in the position shown in FIG. 1.

When one or more of the fishing rod and reel assemblies are to be used, the fastening assembly 210 for that rod and reel assembly is released by releasing the first "Velcro" panel 214 from the second "Velcro" panel 215. As shown in FIGS. 1 and 4, such release of the fastening assembly frees not only the fishing line 35 and hook 39, but also makes the fishing rod and reel assembly available for removal. Thus, describing removal of the bait casting rod and reel assembly 20 contained in the first compartment 181 for illustrative convenience, release of the fastening assembly 210 frees the first compartment for access to the rod and reel assembly. The handle section 22 and tip section 42 thereof are grasped and pulled from the first compartment together with the associated bait casting reel assembly 30. The arm 32 of the bait casting reel assembly slides outwardly from the guide passage 193 as the assembly is removed. Thereafter, the ferrule 44 of the tip section 42 is slidably mounted on the ferrule 28 of the handle section 22 in the conventional fashion. The bait casting rod and reel assembly is thus immediately available for use.

This same process is repeated relative to the spinning rod and reel assembly 60 and the trolling rod and reel assembly 100. When the rod and reel assemblies are again ready to be stored, the process is reversed. The rid and reel assemblies are returned to their respective first compartment 181, second compartment 182 and third compartment 183 as already described.

Therefore, container of the present invention is operable to house one or more work objects in positions substantially ready for use; is particularly well suited to the containerization of fishing rod and reel assemblies in substantially fully assembled configurations ready for use, but otherwise protected from damage; possesses the ability to house two or more fishing rod and reel assemblies in ready positions and so arranged as to be balanced for convenient handling; occupies a minimum of area and can readily be moved between predetermined storage and transport attitudes; is operable releasably to constrain fishing appliances such as lures, hooks and the like in ready positions substantially without hazard; and is otherwise entirely effective in achieving its operational objectives.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. A container for a work object composed of a pair of subassemblies interconnected by a linking member, the container comprising a housing having an internal chamber dimensioned to receive at least a potion of said work object therewithin, a passage in the housing laterally bounded by edges of said housing and through which said linking member of the work object extends when the work object is in a position in the internal chamber ready for removal therefrom and said edges of the housing are operable substantially to restrain the linking member, and thereby the work object, against lateral dislocation from the ready position and wherein said housing and the internal chamber thereof are composed of a first section, enclosing said portion of one subassembly of said pair of subassemblies with the linking member extending through the passage to support the other subassembly of said pair of subassemblies externally of the housing in the ready position, and a second section, having a back wall and an entrance opening communicating with the passage for movement of the work object to and from said ready position.

2. The container of claim 1 in which said work object is a fishing rod and reel assembly in which one subassembly of said pair of subassemblies is the fishing rod, the other subassembly of said pair is the reel assembly, said linking member is a mount interconnecting the fishing rod and the reel assembly, the fishing rod and reel assembly mount a fishing line having a fishing appliance adjacent to the terminal end thereof and wherein means are mounted on the housing remote from said passage for releasably capturing said fishing appliance in a fixed position when the fishing rod and reel assembly are in said ready position.

3. The container of claim 2 wherein said capturing means includes a "Velcro" fastener composed of first and second portions engageable releasably to capture the fishing appliance therebetween.

4. The container of claim 3 wherein one of said first or second portions of the "Velcro" fastener is mounted on the housing and the other of said first or second portions of the "Velcro" fastener is mounted on a member extendable across said entrance opening of the second section of the housing to capture the fishing rod in said ready position.

5. A container for work objects each composed of a pair of subassemblies interconnected by a linking member, the container comprising a substantially tubular housing having a longitudinal axis, an internal chamber dimensioned to receive at least a portion of at least one of said work objects therewithin, a passage in the housing laterally bounded by edges of the housing and through which said linking member of the work object extends when the work object is in a position in the internal chamber ready for removal therefrom and said edges of the housing are operable substantially to restrain the linking member, and thereby the work object, against lateral dislocation from the ready position and the housing has walls substantially radially related to said longitudinal axis segmenting the internal chamber into three substantially identical compartments each individually adapted to receive one of said work objects.

6. A container for a work object composed of a pair of subassemblies interconnected by a linking member, the container comprising a housing having a first portion bounding an internal chamber with a slot extending through the housing into communication with said internal chamber and laterally dimensioned substantially slidably to receive said linking member of the work object in movement to and from a ready position, with one of said subassemblies in the internal chamber of the housing and the other of said subassemblies externally disposed relative to the first portion of the housing, and a second portion having a back wall leading to said first portion of the housing and, with said first portion, defining an entrance opening to the internal chamber of the first portion for movement of the work object to and from said ready position.

7. The container of claim 6 wherein the first portion of the housing has a base defining a plane engageable with a surface of support and so oriented to retain the housing, and thereby the work object therewithin, in substantially stable, upright relation in said ready position.

8. The container of claim 7 wherein a handle is mounted on the housing in spaced relation to said base for grasping for use in transporting the housing, and thereby the work object therewithin, in an attitude substantially transversely related to said upright relation.

* * * * *

UNITED STATES PATENT AND TRADEMARK OFFICE
CERTIFICATE OF CORRECTION

PATENT NO. : 5,366,076
DATED : November 22, 1994
INVENTOR(S) : JOHN M. LYLES

It is certified that error appears in the above-identified patent and that said Letters Patent is hereby corrected as shown below:

Column 1, line 18, after "equipment," insert ---it---.

line 47, after "so" insert ---as---.

line 49, delete "container" and substitute ---containers---.

Column 4, line 67, delete "she" and substitute ---the---.

Column 5, line 44, delete "employee" and substitute ---employed---.

Column 6, line 52, after "90" insert ---°---.

Column 7, line 17, delete "rid" and substitute ---rod---.

UNITED STATES PATENT AND TRADEMARK OFFICE
CERTIFICATE OF CORRECTION

PATENT NO. : 5,366,076
DATED : November 22, 1994
INVENTOR(S) : John M. Lyles

It is certified that error appears in the above-indentified patent and that said Letters Patent is hereby corrected as shown below:

Column 7, line 47, delete "potion" and substitute —portion—.

Signed and Sealed this

Thirty-first Day of January, 1995

Attest:

BRUCE LEHMAN

Attesting Officer

Commissioner of Patents and Trademarks